US010535155B2

(12) United States Patent
Cao et al.

(10) Patent No.: US 10,535,155 B2
(45) Date of Patent: Jan. 14, 2020

(54) SYSTEMS AND METHODS FOR ARTICULATED POSE ESTIMATION

(71) Applicants: Toyota Motor Engineering & Manufacturing North America, Inc., Erlanger, KY (US); Carnegie Mellon University, Pittsburgh, PA (US)

(72) Inventors: Zhe Cao, Pittsburgh, PA (US); Qi Zhu, Urbana, IL (US); Yaser Sheikh, Pittsburgh, PA (US); Suhas E. Chelian, San Jose, CA (US)

(73) Assignees: Toyota Motor Engineering & Manufacturing North America, Inc., Plano, TX (US); Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 15/791,986

(22) Filed: Oct. 24, 2017

(65) Prior Publication Data

US 2019/0122380 A1 Apr. 25, 2019

(51) Int. Cl.
*G06K 9/00* (2006.01)
*G06T 7/70* (2017.01)
*G06K 9/62* (2006.01)
*G06K 9/66* (2006.01)

(52) U.S. Cl.
CPC .............. *G06T 7/70* (2017.01); *G06K 9/6202* (2013.01); *G06K 9/66* (2013.01)

(58) Field of Classification Search
CPC ....................................................... G06T 7/70
USPC ....................................................... 382/103
See application file for complete search history.

(56) References Cited

U.S. PATENT DOCUMENTS

| 6,018,728 | A | 1/2000 | Spence et al. |
|---|---|---|---|
| 6,526,156 | B1 | 2/2003 | Black et al. |
| 7,627,170 | B2 | 12/2009 | Aboutalib et al. |
| 7,940,960 | B2 | 5/2011 | Okada |
| 8,830,236 | B2 | 9/2014 | Germann et al. |
| 9,002,098 | B1 | 4/2015 | Chelian et al. |
| 9,031,286 | B2 | 5/2015 | Kawaguchi et al. |
| 2010/0220173 | A1* | 9/2010 | Anguelov .......... H04N 5/23238 348/36 |
| 2010/0232727 | A1* | 9/2010 | Engedal ............... H04N 13/204 382/285 |
| 2015/0278642 | A1* | 10/2015 | Chertok ................... G06N 3/02 382/156 |
| 2016/0371855 | A1* | 12/2016 | Jovanovic ................ G06T 7/60 |
| 2017/0169304 | A1* | 6/2017 | Jia ....................... G06K 9/00906 |
| 2018/0039848 | A1* | 2/2018 | Konolige ................. G06T 7/75 |

* cited by examiner

*Primary Examiner* — Stephen P Coleman
(74) *Attorney, Agent, or Firm* — Dinsmore & Shohl LLP

(57) ABSTRACT

Systems and methods for articulated pose estimation are provided. Some embodiments include training a convolutional neural network for object pose estimation, which includes receiving a two-dimensional training image of an articulated object that has a plurality of components and identifying, from the two-dimensional training image, at least one key point for each of the plurality of components. Some embodiments also include testing the accuracy of the object pose estimation, which includes visualizing a three or more dimensional pose of each of the plurality of components of the articulated object from a two-dimensional testing image and providing data related to the visualization for output.

20 Claims, 8 Drawing Sheets

SYSTEMS AND METHODS FOR ARTICULATED POSE ESTIMATION

TECHNICAL FIELD

Embodiments described herein generally relate to systems and methods for articulated pose estimation and, more specifically, to embodiments for utilizing two-dimensional images to provide pose estimation of an articulated object.

BACKGROUND

Pose estimation is a desire in both the object detection field, as well as in the robotics field. As an example, in order to create an autonomous robot, the sensory system of the robot must be able to detect and identify objects in an environment such that the robot may avoid and/or grasp the intended object. Additionally, while many current solutions deal with pose estimation of rigid objects, pose estimation of articulated objects is often still a problem. Additionally, many of these current solutions perform pose estimation by creating a three-dimensional model of the object and/or using a red-green-blue three dimensional sensor to capture the object in three dimensions. However, these current solutions often consume large amounts of rich data and have other undesirable effects.

SUMMARY

Systems and methods for articulated pose estimation are provided. Some embodiments include training a convolutional neural network for object pose estimation, which includes receiving a two-dimensional training image of an articulated object that has a plurality of components and identifying, from the two-dimensional training image, at least one key point for each of the plurality of components. Some embodiments also include testing the accuracy of the object pose estimation, which includes visualizing a three or more dimensional pose of each of the plurality of components of the articulated object from a two-dimensional testing image and providing data related to the visualization for output.

In another embodiment, a system for articulated pose estimation includes a processor, a convolutional neural network, and a memory component that stores training logic and testing logic. The training logic, when executed by the processor, causes the system to cause the convolutional neural network to identify, from a two-dimensional training image, a two-dimensional location of at least one key point on an articulated object. Additionally, the testing logic, when executed by the processor, causes the system to receive a two-dimensional testing image that includes the articulated object, deploy the convolutional neural network to determine the two-dimensional location of the key point in the two-dimensional testing image, and cause visualization of a three or more dimensional pose of the articulated object from the two-dimensional location of the key point.

In yet another embodiment, a system includes a robot device, a processor, and a memory component. The memory component may store training logic, testing logic, and convolutional neural network logic. The training logic, when executed by the processor causes the system to cause the convolutional neural network logic to identify, from a two-dimensional training image, a two-dimensional location of at least one key point on an articulated object. The testing logic, when executed by the processor, may cause the system to receive a two-dimensional testing image of the articulated object, deploy the convolutional neural network logic to determine, from the two-dimensional testing image, the two-dimensional location of the key point, and determine a three or more dimensional pose of the articulated object from the two-dimensional location of the key point in the two-dimensional testing image. In some embodiments, the testing logic causes the system to provide data related to the accuracy for display.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for articulated pose estimation. Some embodiments are configured to train and test a convolutional neural network to perform pose estimation of an articulated object using two-dimensional images. Training begins with one or more object models. Each object model may be a three-dimensional model and may contain textured meshes for each component of an articulated object. In the case of a pair of scissors, there is textured mesh for each half of the scissors. The object models may additionally include one or more key points, which may be automatically generated and/or identified by a user.

Training continues by rendering each object model in a variety of viewpoints, backgrounds, lighting conditions and articulations. Rendering the object model may include receiving a two-dimensional image of the articulated object in a plurality of scenarios; utilizing an image capture device to capture images of the articulated object; and/or overlaying the object model into two-dimensional images of these environments. Regardless, for each image, the location of key points along each part of the articulated item is noted. Key points may include distinctive visual features which can be used to recognize the articulated object. Depending on the particular embodiment, the Unreal engine may be utilized for rendering because of its ability to render images quickly.

Training continues by training a pose machine convolutional neural network (CNN) module. Inputs to the CNN include the rendered images and the location of the key points in each image. The CNN learns the mapping between images and the two-dimensional location of key points in the images without having to explicitly know the kinematic chain of each articulated object. Further, the CNN learns to be invariant to conditions which are not relevant to the recovering the pose of the articulated object such as changes caused by different backgrounds or lighting conditions.

The testing process takes two-dimensional testing images and applies the trained pose machine CNN to them. The CNN provides the two-dimensional location of key points. The testing process continues with a Perspective-n point (PnP) module, which takes the two-dimensional locations of key points and solves for the six-dimensional pose that generated the location of the key points. Here, robust statistics algorithms such as random sample consensus (RANSAC), which may also be part of the testing logic, can be used to eliminate at least one false key point match. The systems and methods for articulated pose estimation incorporating the same will be described in more detail, below.

Figure 1:
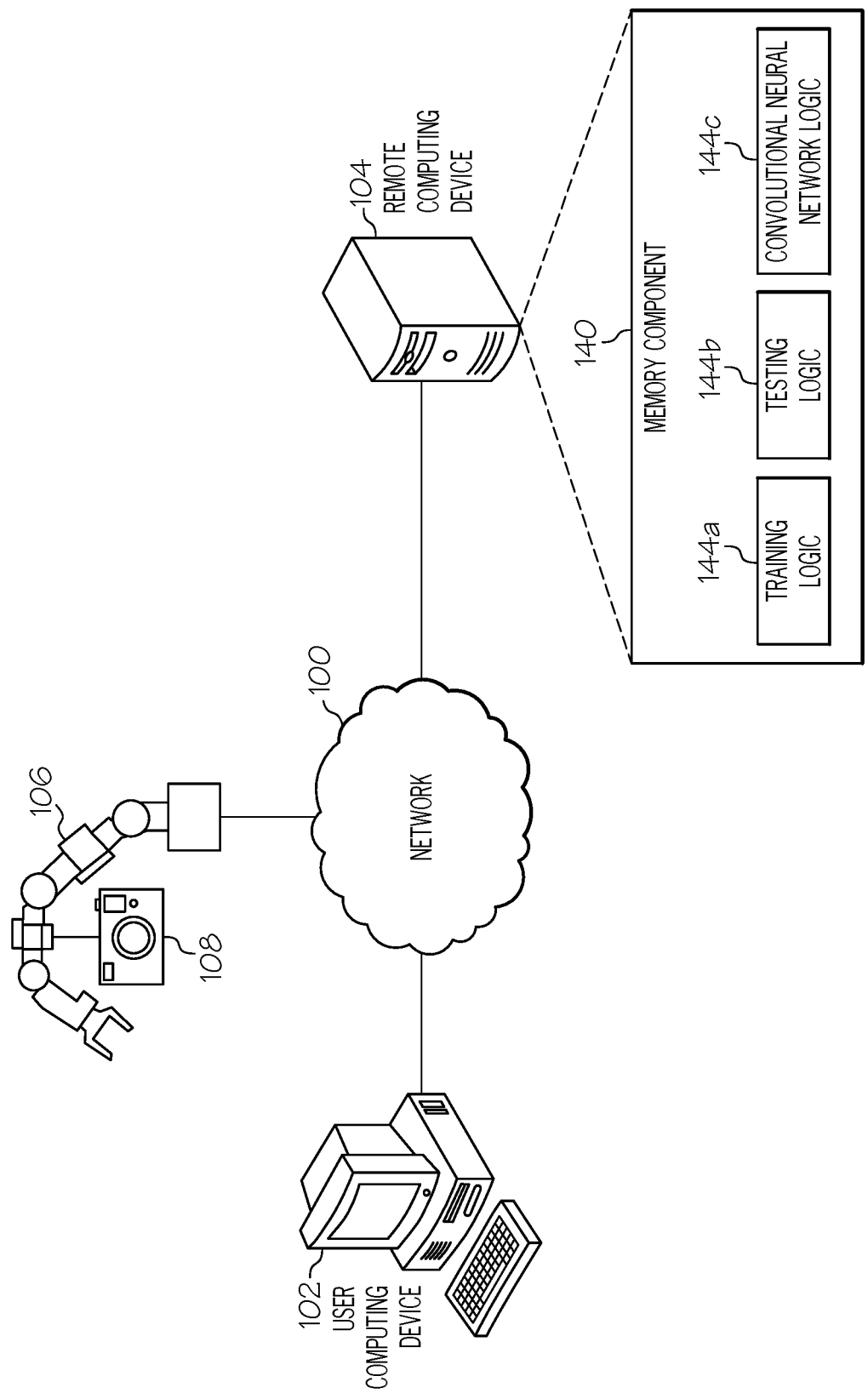
FIG. 1 depicts an environment for articulated pose estimation, according to embodiments described herein.

Referring now to the drawings, FIG. 1 depicts an environment for articulated pose estimation, according to embodiments described herein. As illustrated, a network 100 may be coupled to a user computing device 102, a remote computing device 104, a robot device 106, and an image capture device 108. The network 100 may include a wide area network (such as the internet, a public switch telephone network, a power network, a cellular network, etc.); a local network (such as an Wi-Fi network, a Bluetooth network, a ZigBee network, a near field network, etc.); and/or any other communication medium for facilitating communication between two or more devices, such as the devices depicted in FIG. 1.

Coupled to the network 100 is a user computing device 102. The user computing device may include a personal computer, a laptop, a tablet, a mobile phone, server, and/or other desktop or mobile device. The user computing device 102 may include a display device for providing one or more user interfaces, as described herein. Additionally, the user computing device 102 may receive user input and/or other forms of input.

The remote computing device 104 may also be embodied as a personal computer, server, mobile device, etc. and may include a memory component 140, which may store training logic 144a, testing logic 144b (which may include the PnP module, the RANSAC algorithm, and/or other components), and convolutional neural network logic 144c. As such, the remote computing device 104 may facilitate the training and testing of a convolutional neural network that is utilized by the robot device 106.

As described in more detail below, the remote computing device 104 may receive image data and/or other data from the image capture device 108 and utilize this data to train and test a convolutional neural network. As is evident, the convolutional neural network may be embodied as one or more hardware components and/or as a software component, such as the convolutional neural network logic 144c stored in the memory component 140.

For simplicity, it will be understood that references herein to the convolutional neural network logic 144c are intended to include both the software embodiments and the embodiments that utilize the convolutional neural network as hardware. In the hardware embodiments, the convolutional neural network may be embodied as one or more components of the user computing device 102, remote computing device 104, the robot device 106, and/or another hardware device (or devices) coupled to the network 100. As described in more detail below, the training logic 144a may be configured to cause the remote computing device 104 to train the convolutional neural network logic 144c and the testing logic 144b may be configured to test the convolutional neural network logic 144c. Similarly, the term convolutional neural network may also be used herein as referring to either the hardware embodiments, the software embodiments, or both.

Also coupled to the network 100 are a robot device 106 and an image capture device 108. The robot device 106 may be configured to locate and/or grab an object (such as an articulated object) in an environment, based on a determined location and pose of the object. The image capture device 108 may be configured to capture a two-dimensional image of the object and send data related to the two-dimensional image of the object to the remote computing device 104 for training the convolutional neural network.

It should be noted that while the remote computing device 104 is depicted in FIG. 1 as being remote from the robot device 106, this is merely an example. In some embodiments, the remote computing device 104 may be integrated into and/or otherwise local to the robot device 106. Similarly, the image capture device 108 is depicted in FIG. 1 as being physically coupled to the robot device 106. Again, this is merely an example, as the image capture device 108 may be located anywhere, so long as positioned to capture the object and send data to the remote computing device 104, the user computing device 102, and/or the robot device 106.

Figure 2:
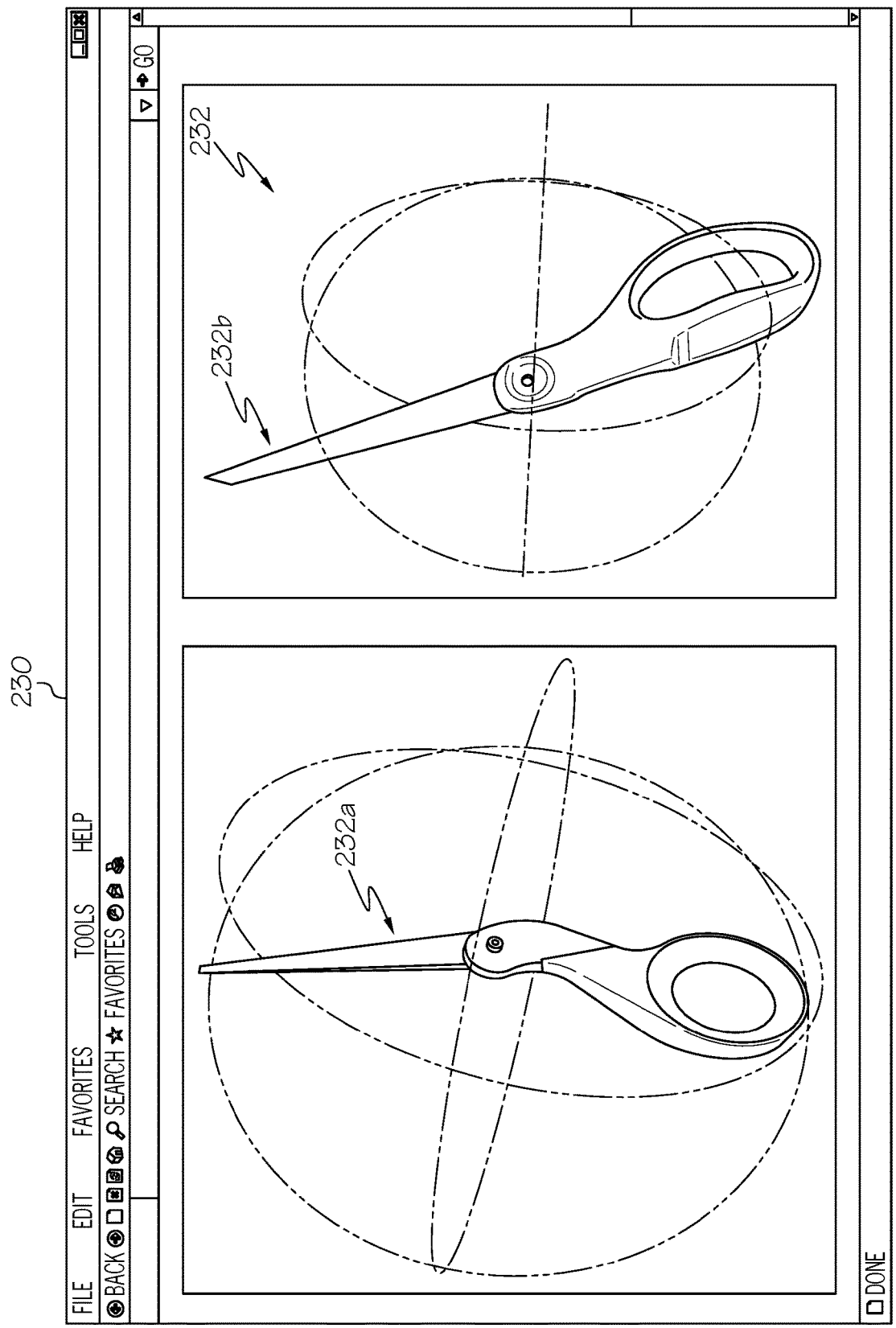
FIG. 2 depicts a user interface for representing an articulated object, according to embodiments described herein.

FIG. 2 depicts a user interface 230 for representing an articulated object, according to embodiments described herein. As illustrated in the user interface 230, an articulated object 232 may depicted as a three-dimensional object model via a simulator, such as a computer-aided design (CAD) program. Depending on the particular embodiment, the simulator program may be part of the training logic 144a or may be a separate piece of software altogether. Regardless, the simulator may individually depict one or more components 232a, 232b of the articulated object 232. In some embodiments, the simulation may take the form of a three-dimensional mesh representation. Additionally, the object model may additionally identify one or more key points on the articulated object 232. In some embodiments, the simulator may automatically identify the key points on the object model. In some embodiments, the user manually specifies the key points. These key points may be spaced apart a predetermined amount and may be placed on edges of the articulated object; at intersections of the individual components, and/or at other predetermined places or placed densely in a random fashion.

Figure 3:
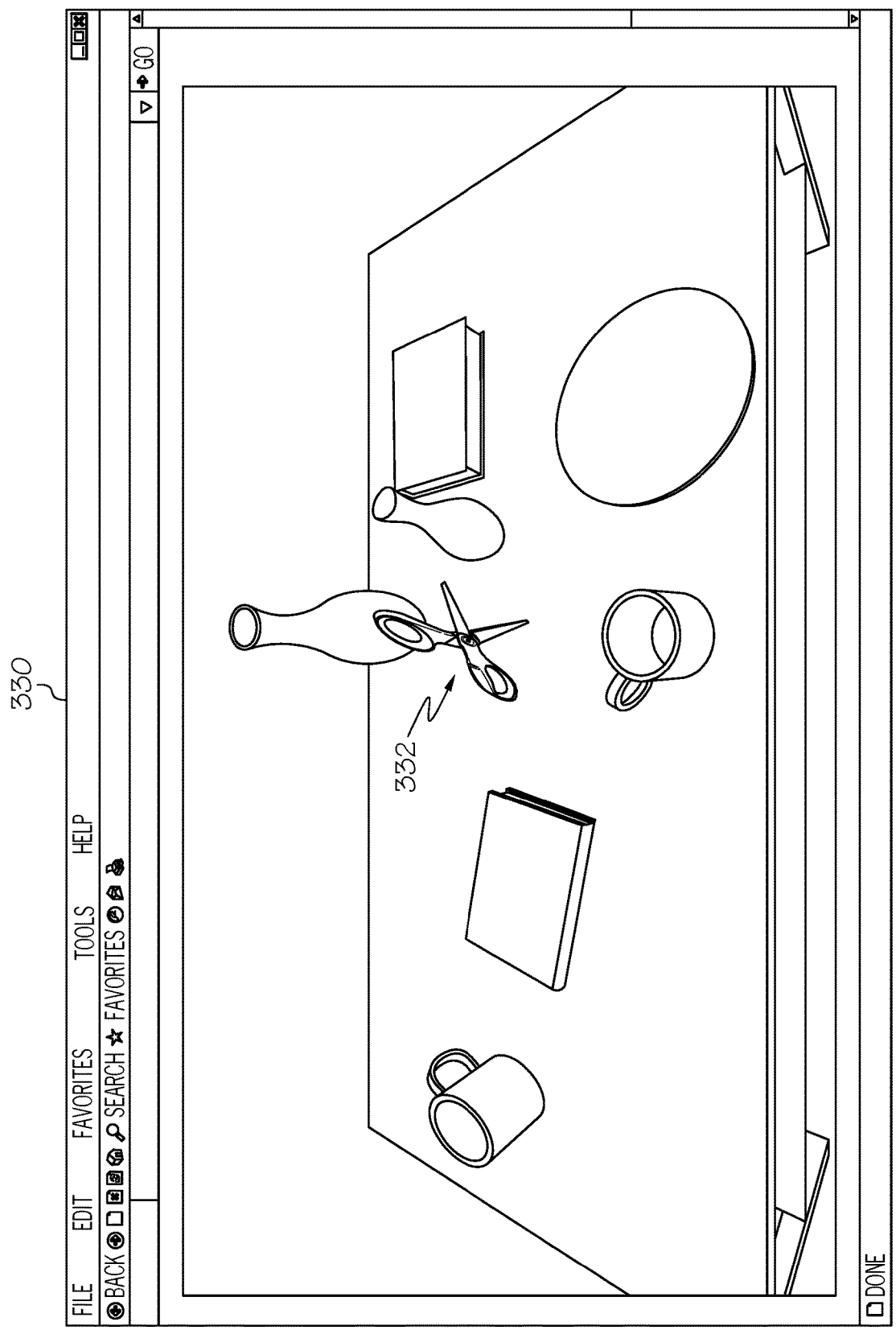
FIG. 3 depicts a user interface for training a convolutional neural network using two-dimensional imagery of the articulated object, according to embodiments described herein.

FIG. 3 depicts a user interface 330 for training a convolutional neural network using two-dimensional imagery of the articulated object 332, according to embodiments described herein. As illustrated, once the articulated object 332 is simulated via the user computing device 102, the image capture device 108 may capture at least one two-dimensional training image of the articulated object 332. In some embodiments, the image capture device 108 does not capture two-dimensional training images, but two-dimensional training images of the articulated object 332 are captured and/or rendered by another device and sent to the remote computing device 104 for training of the convolutional neural network logic 144c.

Regardless, the two-dimensional training images that are utilized may have the articulated object 332 placed in a relatively uncluttered and well-lit environment, thus making it easier for the training logic 144a to train the convolutional neural network logic 144c, such as in FIG. 3. Specifically, because there are fewer other objects in the two-dimensional training image, the convolutional neural network logic 144c may more easily learn the how to identify the articulated object 332. During additional training, the articulated object 332 may be provided in an environment that is more cluttered, darker, and/or otherwise more difficult for the convolutional neural network logic 144c to locate the articulated object 332 to provide a more robust convolutional neural network.

Figure 4:
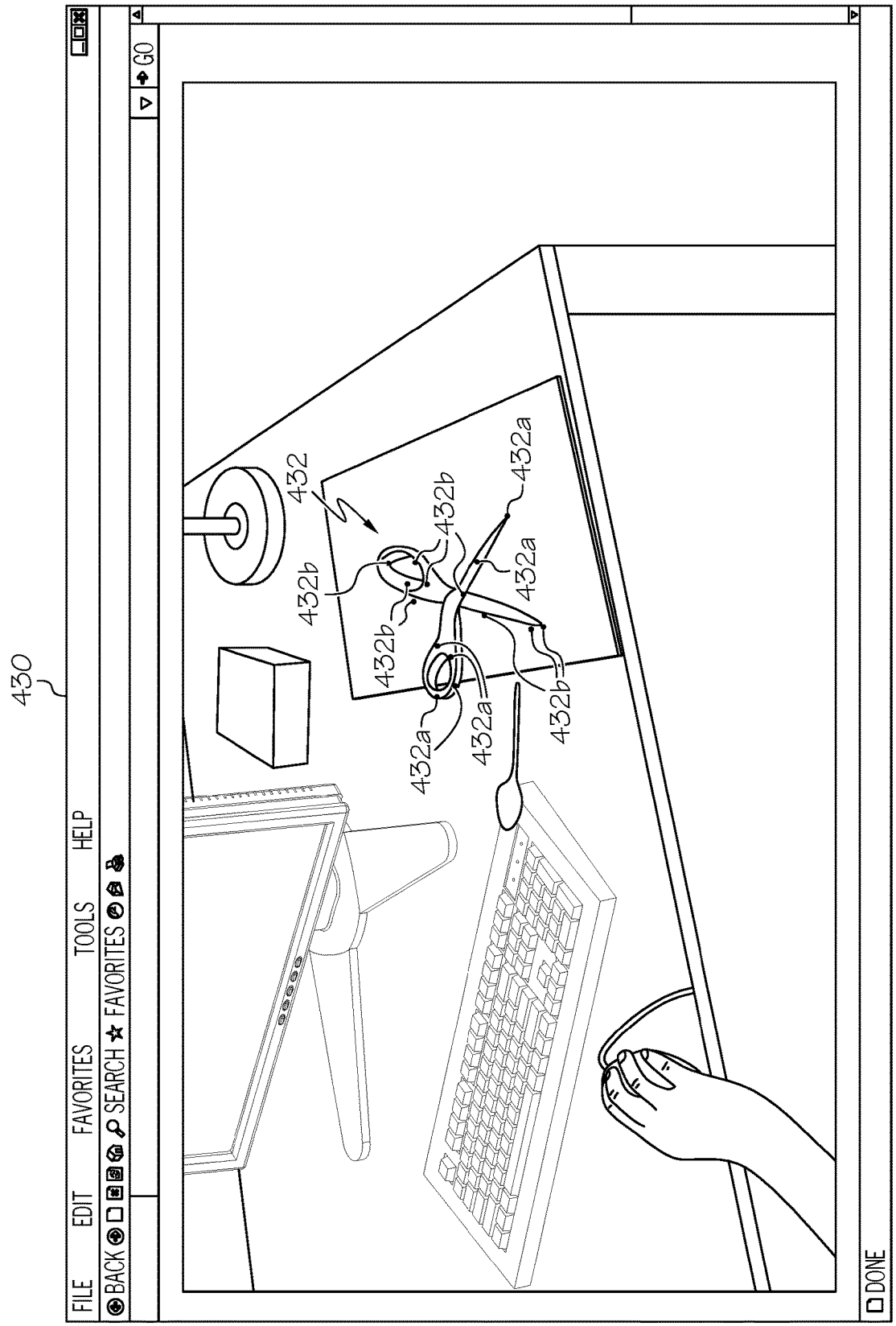
FIG. 4 depicts a user interface for providing a representation of identifying a key point on each portion of an articulated object, according to embodiments described herein.

FIG. 4 depicts a user interface 430 for providing a representation of identifying a key point 432a on each portion of an articulated object 432, according to embodiments described herein. Specifically, the user interface 430 may be provided during training and/or during testing of the convolutional neural network logic 144c. During training, the training logic 144a may cause the remote computing device 104 to identify one or more key points 432a on a first component of the articulated object 432 and one or more key points 432b on a second component of the articulated object 432. If identified during training, the key points 432a, 432b may be represented as a heat map, with color coding assigned, based on a level of confidence that the identified key points 432a, 432b are accurate. As training continues, the heat map identifiers of the key points 432a, 432b may reduce in size, as the confidence of the identified key points 432a, 432b increases. Once the confidence reaches a predetermined threshold, training may be complete and testing may commence.

Regarding testing, the user interface 430 may represent a two-dimensional testing image that includes key points without a heat map and may represent locations of interest in the two-dimensional image of the articulated object 432. As described in more detail below, the two-dimensional key points 432a, 432b may be utilized by the PnP module, which may be part of the testing logic 144b. The PnP module may take the two-dimensional locations of key points and solve for the six-dimensional pose that generated the location of the key points. It will be understood that FIG. 4 depicts the articulated object 432 in a first environment, while other embodiments may depict the articulated object 432 in a second environment, with different lighting, positioning, and clutter. It will also be understood that in some embodiments, testing may also utilize a heat map of the key points to demonstrate confidence of the identified key points and allow a user to re-implement training. Additionally, robust statistics algorithms such as RANSAC may be used to eliminate false key point matches.

Figure 5:
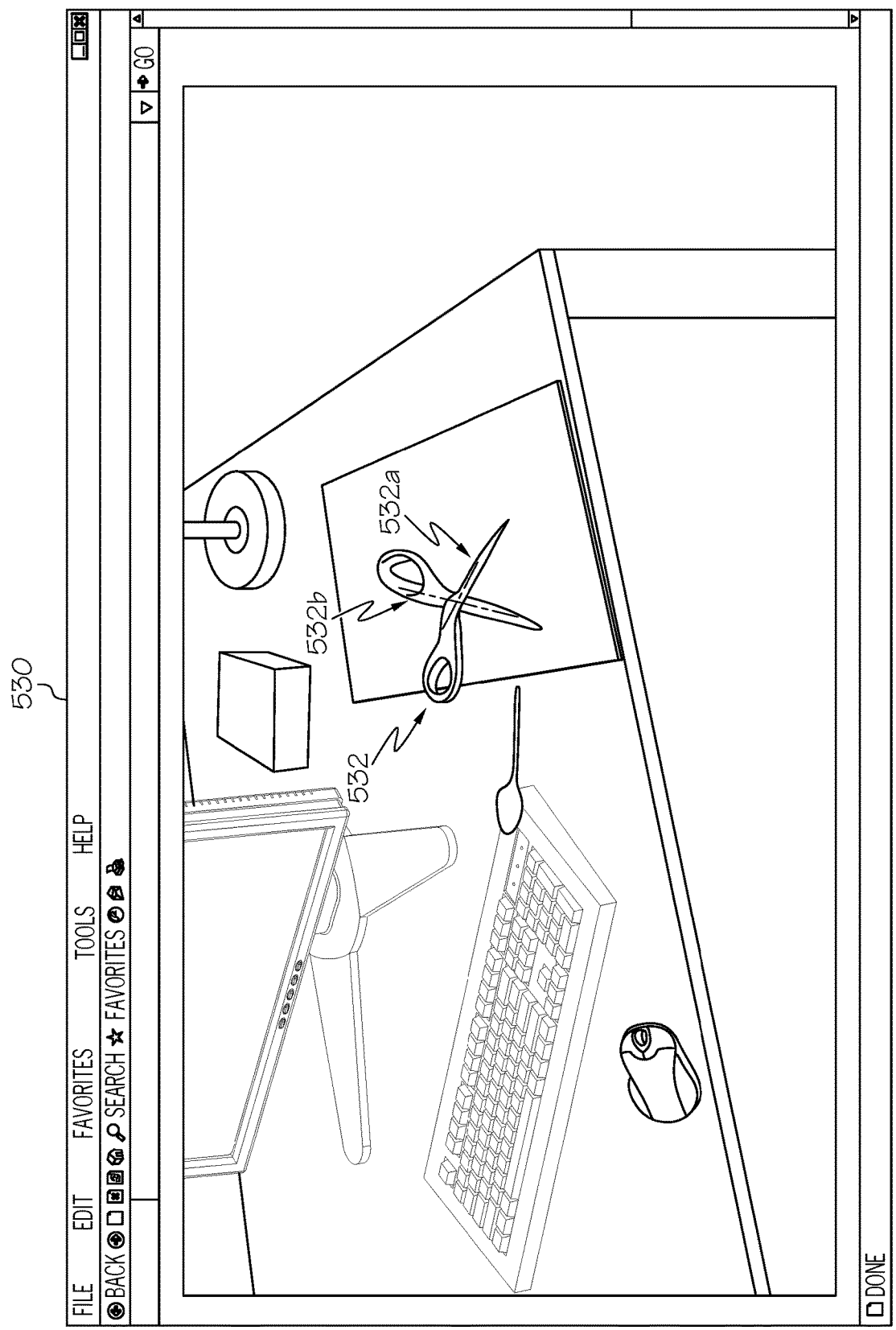
FIG. 5 depicts a user interface for providing a representation of visualizing a six-dimensional representation of the articulated object, according to embodiments described herein.

FIG. 5 depicts a user interface 530 for providing a representation of visualizing a six-dimensional representation of the articulated object 532, according to embodiments described herein. As illustrated, during testing of the convolutional neural network logic 144c, the remote computing device 104 may utilize the PnP module on a two-dimensional testing image to determine the six-dimensional pose of the articulated object (three Cartesian dimensions, plus pitch, roll, and yaw) from the two-dimensional key points that were identified of the articulated object 432 (FIG. 4). Depending on the particular embodiment, a user interface (such as the user interface 530) may be presented with a line 532a, 532b drawn to identify at least one of the components of the articulated object 532.

In some embodiments, once the pose estimation is complete, a verification procedure may be performed. Specifically, these embodiments may be configured to render the object model into the pose detected by the PnP and to compare the rendered object model with the hypothesized image region containing the object. A comparison module may then be made to determine whether the detected pose is accurate against a predetermined threshold. If not, a false pose estimate may be rejected. If the comparison indicates that the accuracy meets the threshold, the system may continue and/or may be deemed complete.

Figure 6:
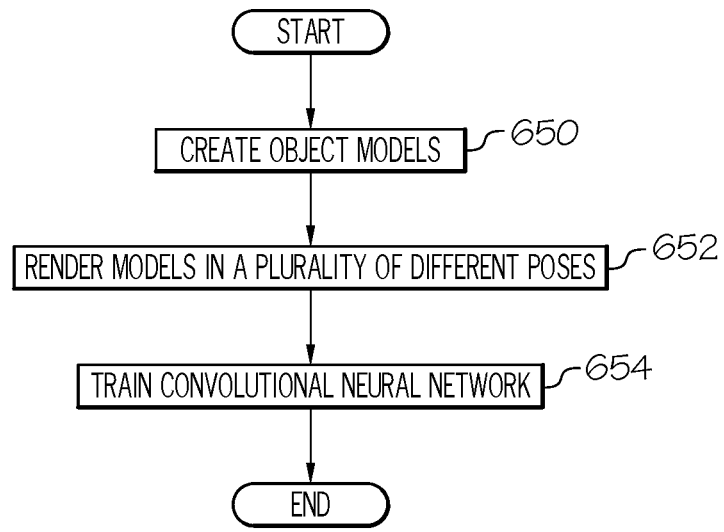
FIG. 6 depicts a flowchart for training a convolutional neural network for articulated pose estimation, according to embodiments described herein.

FIG. 6 depicts a flowchart for training the convolutional neural network logic 144c for articulated pose estimation, according to embodiments described herein. As illustrated in block 650, one or more object models may be created. These object models may include a mesh model that is created via a CAD program. The object models may include an object model for each articulated component of the articulated object. In block 652, the object models may be rendered in a plurality of different poses. As described with reference to FIG. 3, the remote computing device 104 may receive two-dimensional images of the articulated object in a plurality of different poses and/or in plurality of different environments to train the convolutional neural network logic 144c to identify two-dimensional key points on the articulated object. Some embodiments may be configured to render the object model created in block 652 into a plurality of poses and insert those object models into images for training the convolutional neural network logic 144c. Similarly, some embodiments may utilize actual images of the articulated object in various environments. Regardless, in block 654, the convolutional neural network logic 144c may be trained utilizing deep learning that estimates positions of key points for the images from block 652.

Figure 7:
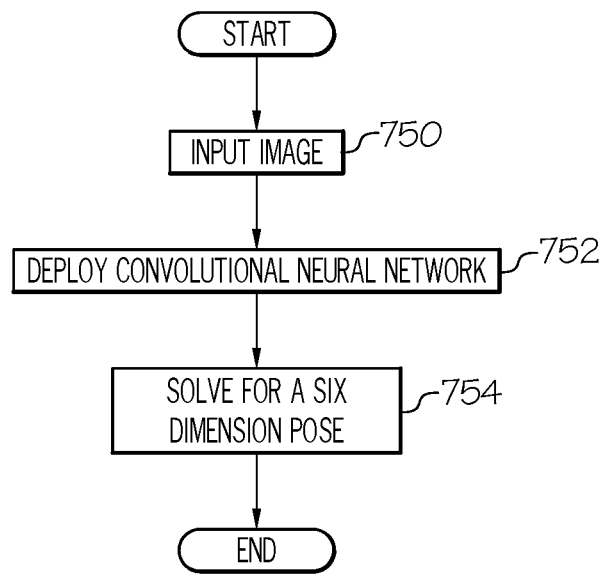
FIG. 7 depicts a flowchart for determining a six-dimensional pose of an articulated object, according to embodiments described herein.

FIG. 7 depicts a flowchart for determining a six-dimensional pose of an articulated object, according to embodiments described herein. As illustrated in block 750, a two-dimensional image may be input into the remote computing device 104. The two-dimensional image may be captured by the image capture device 108, however this is not a requirement. In block 752, the remote computing device 104 (and/or other device) may deploy a convolutional neural network to identify two-dimensional key points of the articulated object in the received image. In block 754, the two-dimensional key points may be utilized to solve for a six-dimensional pose of the articulated object. As described above, some embodiments may additionally be configured to verify the pose estimation by rendering a validation object model of the articulated object in the determined pose and comparing this image with the captured image. A comparison may be made to determine whether the pose estimate is accurate within a predetermined accuracy threshold. If so, data related to the pose estimation may be sent to the robot device 106 and/or output to a user. If not, training may be re-implemented and reported to the user.

Figure 8:
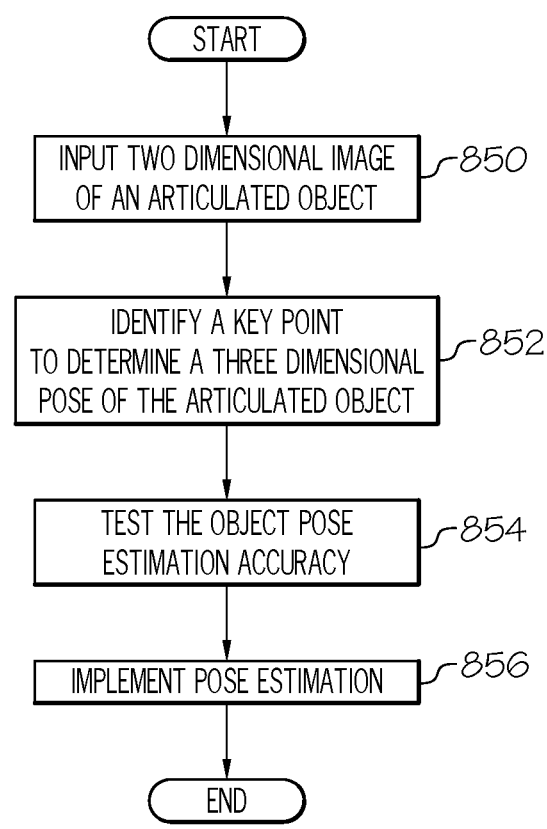
FIG. 8 depicts a flowchart for utilizing a robot to perform a task, based on a determined six-dimensional pose of an articulated object, according to embodiments described herein.

FIG. 8 depicts a flowchart for utilizing a robot to perform a task, based on a determined six-dimensional pose of an articulated object, according to embodiments described herein. As illustrated in block 850, an image of an articulated object may be may be input, where the articulated object has a plurality of components. In block 852, a key point of each of the plurality of components may be identified from the image, where the key point is identified at a two-dimensional location that is utilized to determine a three-dimensional pose of the articulated object. In block 854, the object pose estimation may be tested for accuracy, which includes visualizing a three or more dimensional pose of each of the plurality of components of the articulated object and solving the three or more dimensional pose from the two-dimensional location of the at least one key point to visualize the three or more dimensional pose of each of the plurality of components of the articulated object. In block 856 the pose estimation may be implemented utilizing a robot device to perform a predetermined task. In some embodiments, if the pose estimation does not meet an accuracy threshold, an output may be sent and testing may be re-implemented. If the accuracy threshold is met, the output may be provided for this as well.

Figure 9:
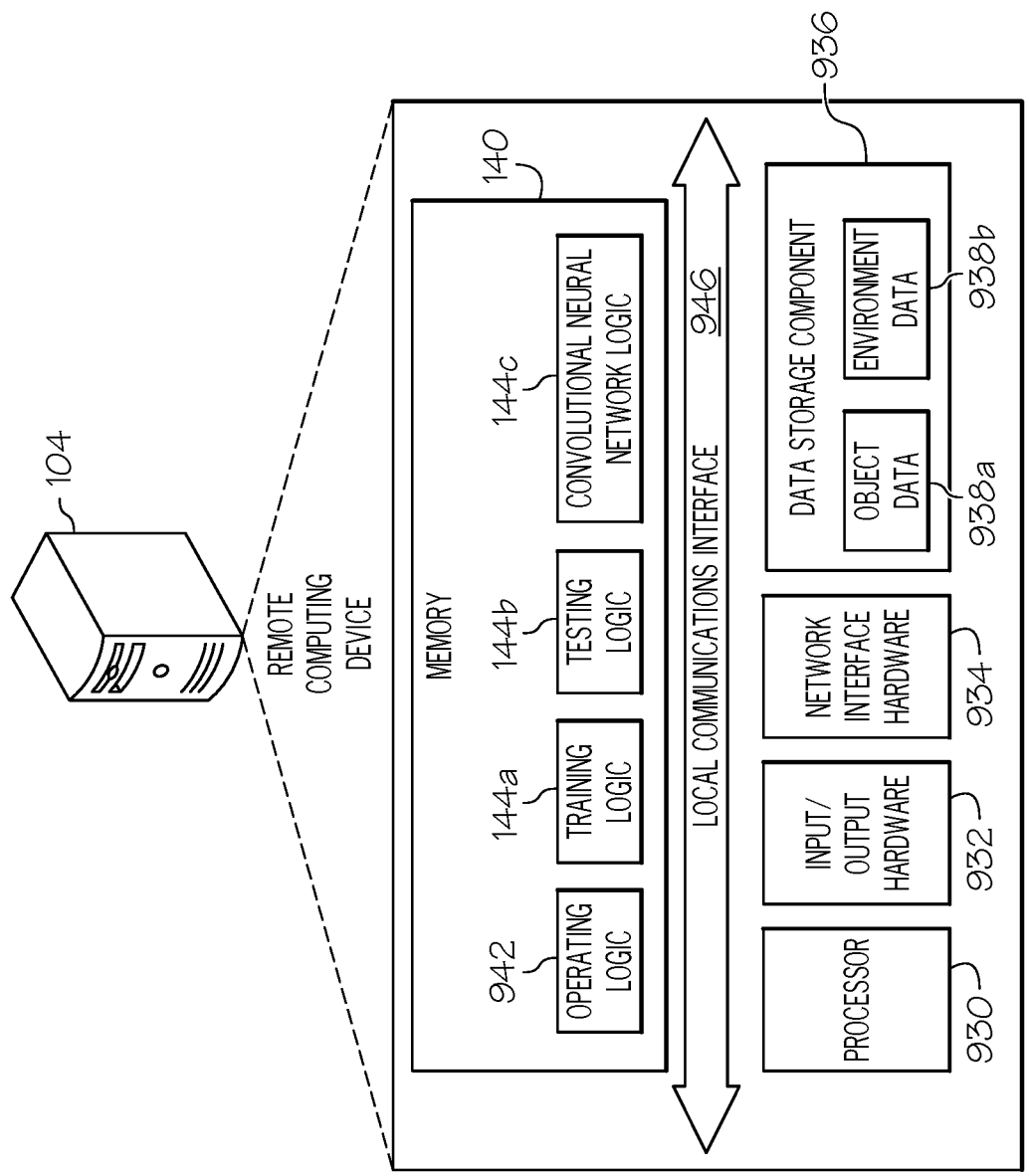
FIG. 9 depicts a remote computing device for articulated pose estimation, according to embodiments described herein.

FIG. 9 depicts a remote computing device 104 for articulated pose estimation, according to embodiments described herein. The remote computing device 104 includes a processor 930, input/output hardware 932, the network interface hardware 934, a data storage component 936 (which stores object data 938*a*, environment data 938*b*, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 104 and/or external to the remote computing device 104.

The memory component 140 may store operating logic 942, the training logic 144*a*, the testing logic 144*b*, and the convolutional neural network logic 144*c*. The training logic 144*a*, the testing logic 144*b*, and the convolutional neural network logic 144*c* may each include a plurality of different pieces of logic, each of which may be embodied as a computer program, firmware, and/or hardware, as an example. A local communications interface 946 is also included in FIG. 9 and may be implemented as a bus or other communication interface to facilitate communication among the components of the remote computing device 104.

The processor 930 may include any processing component operable to receive and execute instructions (such as from a data storage component 936 and/or the memory component 140). As described above, the input/output hardware 932 may include and/or be configured to interface with the sensors, devices, and other components, such as those depicted in FIG. 1.

The network interface hardware 934 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the remote computing device 104 and other computing devices, such as a mobile device, a server, etc.

The operating logic 942 may include an operating system and/or other software for managing components of the remote computing device 104. As also discussed above, the training logic 144*a* may reside in the memory component 140 and may be configured to cause the processor 930 to train the convolutional neural network logic 144*c*, as described above. Similarly, the testing logic 144*b* may be utilized to test the convolutional neural network logic 144*c*.

It should be understood that while the components in FIG. 9 are illustrated as residing within the remote computing device 104, this is merely an example. In some embodiments, one or more of the components may reside external to the remote computing device 104. It should also be understood that, while the remote computing device 104 is illustrated as a single device, this is also merely an example. In some embodiments, the training logic 144*a*, the testing logic 144*b*, and/or the convolutional neural network logic 144*c* may reside on different computing devices. As an example, one or more of the functionality and/or components described herein may be provided by a remote computing device and/or mobile device, which may be coupled to the remote computing device 104 via a network, such as a local network and/or a wide area network.

Additionally, while the remote computing device 104 is illustrated with the training logic, 144*a* the testing logic 144*b*, and the convolutional neural network logic 144*c* as separate logical components, this is also an example. In some embodiments, a single piece of logic may cause the remote computing device 104 to provide the described functionality.

As illustrated above, various embodiments articulated pose estimation are disclosed. These embodiments may be configured to utilize a two-dimensional image for training and testing of a convolutional neural network that is capable of performing six-dimensional pose estimation utilizing the two-dimensional image.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for articulated pose estimation. It should also be understood that these embodiments are merely exemplary and are not intended to limit the scope of this disclosure.

What is claimed is:

1. A method for articulated pose estimation comprising:
   training a convolutional neural network for object pose estimation, which includes at least the following:
     receiving a two-dimensional training image of an articulated object, wherein the articulated object includes a plurality of components; and
     identifying, from the two-dimensional training image, at least one key point for each of the plurality of components; and
   testing accuracy of the object pose estimation, which includes at least the following:
     rendering a three or more dimensional pose of each of the plurality of components of the articulated object from a two-dimensional testing image;
     solving the three or more dimensional pose from the two-dimensional location of the at least one key point to render the three or more dimensional pose of each of the plurality of components of the articulated object; and
     providing data related to the rendering for output.

2. The method of claim 1, wherein testing accuracy of the object pose estimation further comprises:
rendering a validation object model of the articulated object in the three or more dimensional pose;
comparing the validation object model to a predetermined rendering of the articulated object to determine whether the validation object model meets a predetermined accuracy threshold; and
in response to determining that the validation object model does not meet the predetermined accuracy threshold, re-implementing training.

3. The method of claim 1, wherein training further comprises generating an object model of the plurality of components of the articulated object.

4. The method of claim 3, wherein receiving the two-dimensional training image includes at least one of the following: receiving the two-dimensional training image of the articulated object in an environment from a remote computing device and rendering the object model into an existing image.

5. The method of claim 1, wherein identifying the at least one key point for each of the plurality of components includes rendering a heat map to indicate a level of confidence associated with the respective at least one key point.

6. The method of claim 1, wherein testing the object pose estimation further includes:
receiving the two-dimensional testing image that includes the articulated object; and
identifying a two-dimensional location of the at least one key point for each of the plurality of components.

7. The method of claim 6, wherein testing accuracy of the object pose estimation further comprises:
implementing a perspective-n point (PnP) module to solve the three or more dimensional pose from the two-dimensional location of the at least one key point; and
eliminating at least one false key point match.

8. A system for articulated pose estimation comprising:
a processor;
a convolutional neural network; and
a memory component that stores training logic and testing logic, wherein the training logic, when executed by the processor, causes the system to perform at least the following;
receive an object model of an articulated object, wherein the object model includes at least one key point for the articulated object;
receive a training image of the articulated object; and
cause the convolutional neural network to identify, from the training image and the object model, a two-dimensional location of the at least one key point in the training image;
wherein the testing logic, when executed by the processor, causes the system to perform at least the following:
receive a two-dimensional testing image that includes the articulated object;
deploy the convolutional neural network to determine the two-dimensional location of the at least one key point in the two-dimensional testing image;
render a three or more dimensional estimated pose of the articulated object from the two-dimensional location of the at least one key point to determine accuracy of the three or more dimensional estimated pose of the articulated object; and
provide data related to the accuracy for display.

9. The system of claim 8, wherein receiving the two-dimensional testing image includes at least one of the following: receiving the two-dimensional testing image of the articulated object in an environment from a remote computing device and rendering the object model into an existing image.

10. The system of claim 8, wherein identifying the at least one key point includes rendering a heat map to indicate a level of confidence associated with the respective at least one key point.

11. The system of claim 8, wherein the testing logic further causes the system to implement a perspective-n point (PnP) module to solve the three or more dimensional pose from the two-dimensional location of the at least one key point.

12. The system of claim 8, wherein determining the three or more dimensional pose of the articulated object includes determining a six-dimensional pose of the articulated object.

13. The system of claim 8, wherein determining the at least one key point includes receiving input from a user to identify the two-dimensional location of the at least one key point.

14. The system of claim 8, wherein the testing logic further causes the system to perform at least the following:
rendering a validation object model of the articulated object in the three or more dimensional pose;
comparing the validation object model to a predetermined rendering of the articulated object to determine whether the validation object model meets a predetermined accuracy threshold; and
in response to determining that the validation object model does not meet the predetermined accuracy threshold, re-implementing training.

15. A system for articulated pose estimation comprising:
a robot device;
a processor; and
a memory component that stores training logic, testing logic, and convolutional neural network logic, wherein the training logic, when executed by the processor causes the system to perform at least the following;
cause the convolutional neural network logic to identify, from a two-dimensional training image, a two-dimensional location of at least one key point on an articulated object;
wherein the testing logic, when executed by the processor, causes the system to perform at least the following:
receive a two-dimensional testing image of the articulated object;
deploy the convolutional neural network logic to determine, from the two-dimensional testing image, the two-dimensional location of the at least one key point;
solve a three or more dimensional estimated pose of the articulated object from the two-dimensional location of the at least one key point in the two-dimensional training image;
determine accuracy of the three or more dimensional estimated pose; and
provide data related to the accuracy for display.

16. The system of claim 15, wherein receiving the two-dimensional training image includes at least one of the following: receiving the two-dimensional training image of the articulated object in an environment from a remote computing device and rendering an object model of the articulated object into an existing image.

17. The system of claim 15, wherein identifying the at least one key point includes rendering a heat map of the at least one key point to indicate a level of confidence associated with the respective at least one key point.

18. The system of claim 15, wherein the testing logic further causes the system to implement a perspective-n point (PnP) module to solve the three or more dimensional pose from the two-dimensional location of the at least one key point.

19. The system of claim 15, wherein determining the three or more dimensional pose of the articulated object includes determining a six-dimensional pose of the articulated object.

20. The system of claim 15, wherein the testing logic further causes the system to perform at least the following:
   render a validation object model of the articulated object in the three or more dimensional pose;
   compare the validation object model to a predetermined rendering of the articulated object to determine whether the validation object model meets a predetermined accuracy threshold; and
   in response to determining that the validation object model does not meet the predetermined accuracy threshold, re-implement training.

* * * * *